United States Patent
Faeuster et al.

(10) Patent No.: US 9,403,480 B2
(45) Date of Patent: Aug. 2, 2016

(54) METHOD AND SYSTEM FOR RESPONDING TO A LANE DEVIATION EVENT OF A VEHICLE

(71) Applicant: FORD GLOBAL TECHNOLOGIES, LLC, Dearborn, MI (US)

(72) Inventors: Daniel Faeuster, Cologne (DE); Erik Jürgen Stumpf, Bedburg (DE); Attila Benak, Cologne (DE); Andrew Brown, Canton, MI (US); Sergio Codonesu, Heerlen (NL); Karl-Peter Hesseler, Lohmar-Donrath (DE); Jan Bremkens, Straelen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/204,649

(22) Filed: Mar. 11, 2014

(65) Prior Publication Data

US 2014/0253309 A1 Sep. 11, 2014

(30) Foreign Application Priority Data

Mar. 11, 2013 (DE) .......................... 10 2013 204 118

(51) Int. Cl.
| B60Q 1/00 | (2006.01) |
| B60Q 9/00 | (2006.01) |
| B60W 50/16 | (2012.01) |
| B62D 15/02 | (2006.01) |
| B60W 50/14 | (2012.01) |

(52) U.S. Cl.
CPC ............. B60Q 9/008 (2013.01); B60W 50/16 (2013.01); B62D 15/025 (2013.01); B60W 2050/146 (2013.01); B60W 2520/10 (2013.01); B60W 2550/147 (2013.01)

(58) Field of Classification Search
CPC . B60Q 9/008; B60W 50/16; B60W 2050/146
USPC ........................ 340/425.5, 426, 438
See application file for complete search history.

(56) References Cited

U.S. PATENT DOCUMENTS

| 7,062,382 | B2 * | 6/2006 | Courtenay .......... B60T 8/17557 303/146 |
| 8,406,956 | B2 | 3/2013 | Wey et al. |
| 8,581,714 | B2 | 11/2013 | Yu et al. |
| 8,665,078 | B2 | 3/2014 | Van Wiemeersch et al. |
| 2005/0246101 | A1 * | 11/2005 | Courtenay .......... B60T 8/17557 701/301 |
| 2006/0217860 | A1 * | 9/2006 | Ihara ..................... B62D 15/025 701/41 |
| 2006/0217861 | A1 * | 9/2006 | Ihara et al. ............... 701/41 |
| 2011/0190972 | A1 * | 8/2011 | Timmons ............... G01C 21/34 701/31.4 |

FOREIGN PATENT DOCUMENTS

| DE | 10 2009 002 821 A1 | 11/2010 |
| WO | WO 2009/030497 A2 | 12/2009 |

OTHER PUBLICATIONS

Examination Report Issued in corresponding German Patent Application No. 102013204118.7, dated Mar. 11, 2013.

* cited by examiner

*Primary Examiner* — Daryl Pope
(74) *Attorney, Agent, or Firm* — Jones Robb, PLLC; Raymond L. Coppiellie

(57) ABSTRACT

Methods and systems are described for providing feedback in the event of a lane deviation of a vehicle having a power steering system. Vehicle data, such as speed, a steering angle, and the like, may be acquired (e.g., from a sensor system of the vehicle). An activation signal may be generated based on the acquired data. A haptic warning may then be generated using the power steering system of the vehicle based on the activation signal.

21 Claims, 2 Drawing Sheets

METHOD AND SYSTEM FOR RESPONDING TO A LANE DEVIATION EVENT OF A VEHICLE

CROSS REFERENCE TO RELATED APPLICATIONS

This application claims priority to German Application No. 102013204118.7, filed on Mar. 11, 2013, the entire content of which is incorporated by reference herein.

TECHNICAL FIELD

The present disclosure relates generally to a method and apparatus for a notification in the event of deviation of a vehicle from an expected path. In particular, the present disclosure relates to a method and apparatus for providing alarm notification in response to a lane deviation of a vehicle.

INTRODUCTION

Motor vehicles can be equipped with a steering aid which facilitates steering of the motor vehicle. The steering aid can be referred to as power steering, and may comprise a hydraulic assisting system (HPAS), an electrical assisting system (EPAS), or an electrohydraulic assisting system (EHPAS). The steering aid can comprise an actuator drive to transmit a desired auxiliary torque for steering the motor vehicle. The electric steering aid can be configured in such a way that a steering activity (e.g., torque) generated by the driver of the motor vehicle can be detected automatically and boosted electrically. When the motor vehicle is traveling at a high speed, steering assistance can be boosted less than when the motor vehicle is traveling at a lower speed. For example, when parking or traveling in town traffic at a relative lower speed, the number of steering movements or the amount of torque applied by the driver can result in an increased level of assistance from the steering aid.

In an example, the steering aid may comprise an active steering system (also referred to as an active front axle steering system or active front steering (AFS) system) that includes an actuator for performing the steering aid and a plurality of sensors for detecting driver input conditions (e.g., steering angle) and other driving conditions. The steering aid may be useful in improving driver and passenger safety. Accordingly, a system that leverages the sensors and/or actuator of a steering aid system to further enhance driver and passenger safety may be desirable.

SUMMARY

In accordance with various exemplary embodiments, the present disclosure provides. Methods and systems are described for providing feedback in the event of a lane deviation of a vehicle having a power steering system. Vehicle data, such as speed, a steering angle, and the like, may be acquired (e.g., from a sensor system of the vehicle). An activation signal may be generated based on the acquired data. A haptic warning may then be generated using the power steering system of the vehicle based on the activation signal.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
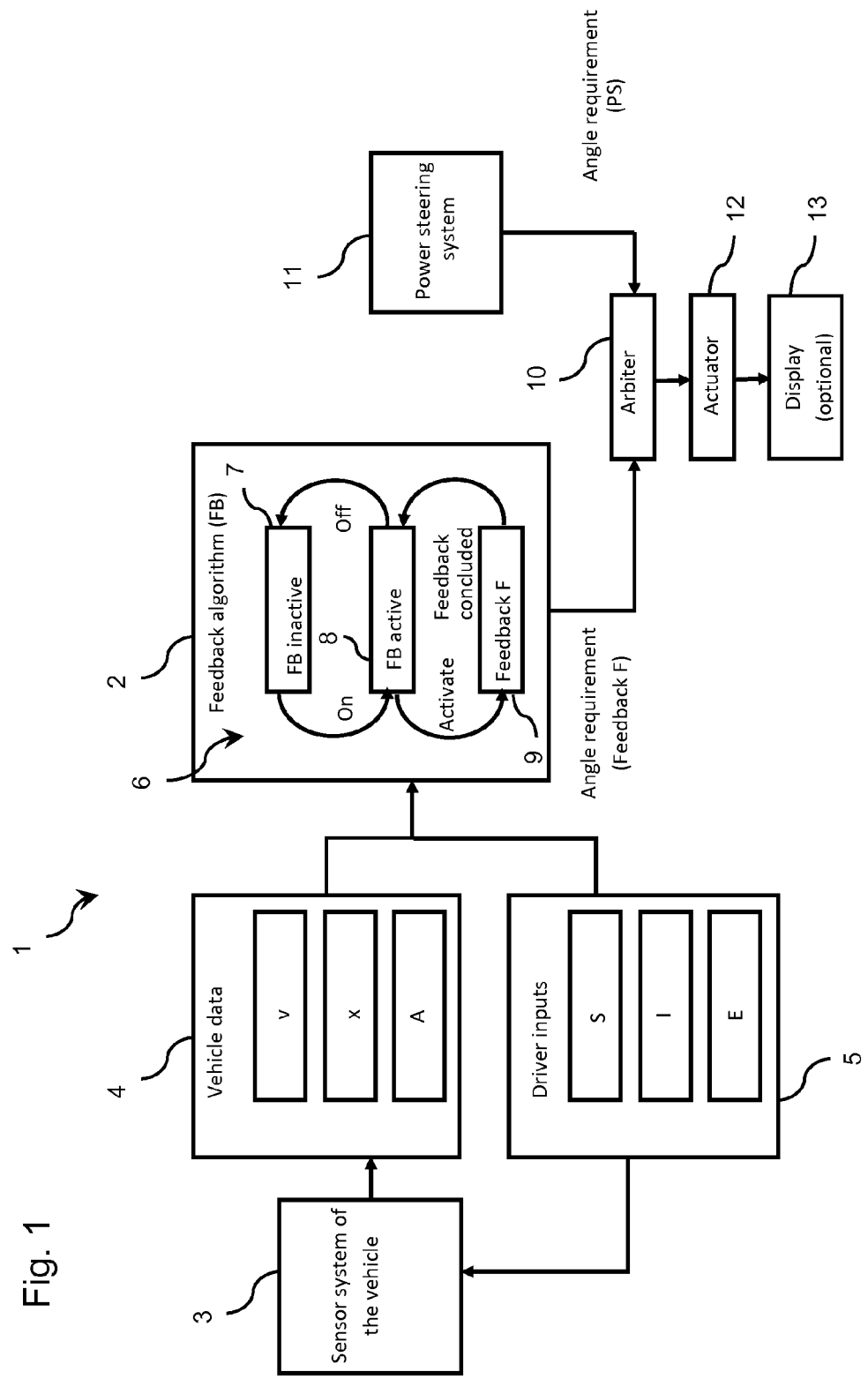
FIG. 1 shows schematic illustration of an apparatus for responding to a lane deviation event of a vehicle in according with the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a method for responding to a lane deviation event of a vehicle is provided. Additionally or alternatively, a method in accordance with the present teachings can provide feedback as a response to a lane deviation event of a vehicle.

The method provides feedback in the event of a lane deviation event of a vehicle. For example, vehicle data (e.g., speed, steering rate and/or yaw rate, and the like) may be monitored in order to detect a lane deviation event. When a lane deviation is detected, the system may provide feedback to the user and/or vehicle. An example of feedback may include an alarm notification (e.g., optical warnings, acoustic warnings, haptic feedback such as vibrations in steering wheel).

In accordance with the present teachings, an exemplary embodiment of the method can include an alarm notification in the event of lane deviations. The feedback algorithm can provide the driver of a vehicle with feedback or a warning if the driver leaves the current lane without having activated an indicator (e.g., turn signal). The warning may comprise, for example, vibrations on the steering wheel, optical or acoustic warnings, or any other suitable warning. In an example, vibrations may be produced by an electromechanical power assisted steering system (EPAS, Electric Power Assisted Steering) or an additional eccentric actuator in the steering system. In an example where a haptic warning is used, the haptic warning may be based on torques and may be triggered by the sensor system of the vehicle, for example a camera module on the vehicle front side.

In accordance with the present teachings, an exemplary embodiment of the method can include vehicles that are equipped with a power steering system. For example, a hydraulic steering assistance system (HPAS, Hydraulic Power Assisted Steering) may be adjusted to include the feedback functionality described herein without the need for an additional actuator. Here, if the vehicle is provided with AFS (Active Front Steering, active front wheel steering), the existing actuator may be leveraged to provide feedback reducing cost of an complexity within the vehicle's systems.

In accordance with the present teachings, an exemplary embodiment of the active steps may utilize vehicle data. The vehicle data may be provided by sensors of the vehicle that monitor the vehicle, parts or components, and/or the environment of the vehicle. The vehicle data may comprise, for example, the speed of the vehicle, the current steering angle, the steering rate and/or the yaw rate, and the like. Further inputs for the method may comprise, for example, the monitoring of the activity of an indicator (e.g., a turn signal), a direction indicator, and/or the location and/or condition of driving lanes. In an example, both direct sensor data and data derived from sensor data may be used.

In accordance with the present teachings, an exemplary embodiment includes an activation signal that triggers, initiates, generates, and/or creates the feedback (e.g., haptic warning). The activation signal may be based in part on vehicle or sensor data that describes the state of the vehicle. In an example, a haptic warning or other warning signal may be generated or output by a power steering system (e.g., AFS system), with the result that the driver receives feedback such as vibrations via the steering wheel. Additionally or alternatively optical or acoustic warnings may be provided.

The haptic warning may comprise a sequence of a plurality of pulses. The warning may be, for example, N pulses, where N may be a predefined number, with a definable or adjustable signal profile or signal waveform such as a sine wave or a sawtooth profile. For each pulse, it is possible to allow the pulse to slowly rise and fall and to define the respective length. The frequency and amplitude of these pulses can also be configured. The haptic warning may be generated using a change in the steering angle of the steering wheel. For example, a component of the steering system may be used to generate the haptic warning, and the change in steering angle of the steering wheel may trigger the component to generate the haptic warning. In particular, an actuator of the AFS may be controlled to create warning impulses.

In accordance with the present teachings, an exemplary embodiment includes receiving inputs from a driver of the vehicle. The inputs may be recorded and taken into account for the generation of the activation signal and/or the generation of the feedback. Accordingly, the driver or user, for example, may switch the warning option on and off, adjust the intensity of the warning, for example low, medium, high, and configure how early a warning is output with respect to the expected departure from the lane (e.g., sensitivity).

In an example, the generation of the activation signal and/or the generation of the haptic warning may be dependent on the speed of the vehicle. For example, the intensity of the warning may be increased or educed on the basis of the speed or the warning may be switched off below a certain speed limit or threshold. The generation of the activation signal and/or of the feedback may also be dependent on the steering angle speed. For example, a fast direction change may generate feedback where a slow direction change may not.

In accordance with the present teachings, an exemplary embodiment includes modifying/adapting the warning based on sensed conditions indicative of road conditions (e.g., road unevenness) from the vehicle data. In an example, the feedback may be generated based on the road unevenness. The intensity of the warning may be adapted to the road conditions, that is to say the road condition may be a further input for the intensity of the warning. For example, a haptic warning may be increased or intensified in the case of poor road conditions in order to make the warnings distinguishable from the influences of the road.

In accordance with the present teachings, an exemplary embodiment includes an arbiter device that may monitor the power steering system and the feedback system in the event of lane deviations. The arbiter may receive input from both a power steering system (e.g., AFS system) and the feedback system, such as a steering angle request, and may process the two inputs. In this example, the arbiter may determine whether performing haptic feedback is safe according to the vehicle data available, as described herein.

In accordance with the present teachings, an exemplary embodiment of the present disclosure includes a system for providing feedback in the event of lane deviations of a vehicle with a power steering system. The system comprises a computation unit for carrying out the method described above. The computation unit may be a separate unit or may be integrated in existing units, for example existing units of the steering system, which are already present and thus use existing hardware and/or software.

In accordance with the present teachings, an exemplary embodiment of the system includes an input device for the driver that is operatively connected to the computation unit. Using the input device, the driver, or some other user, may switch the feedback option on and off, adjust the intensity of the feedback (e.g., intensity of a haptic warning), for example low, medium, high, and configure when (e.g. how early) the feedback is output with respect to the expected departure from the lane (e.g., sensitivity).

In accordance with the present teachings, an exemplary embodiment of the system includes a safety device or arbiter device for monitoring a power steering system and the computation unit. The safety device or arbiter may receive input from both the power steering system (e.g., AFS system) and the feedback system, such as a steering angle request, and may process the two inputs. The safety device or arbiter may limit functionality in order to monitor and/or control the power steering system together with the feedback system in order to ensure safe operation of the vehicle.

FIG. 1 illustrates a system 1 for providing feedback in the event of lane deviations of a vehicle according to an exemplary embodiment of the present disclosure. A control computer or a computation unit 2 at least partially executes a control algorithm for providing feedback in the event of lane a deviation e.g., (a lane change without using the turn signal). This algorithm is described further below in connection with FIG. 2.

One or more sensors (e.g., sensor systems 3) may generate sensor data or vehicle data. The data may be generated from one or more sensors or sensor system 3 of the vehicle or components of the vehicle and the vehicle data 4 may comprise the speed of the vehicle (v), further states or values (x), an activation signal (A), and any other suitable vehicle data. The vehicle data 4 and at least the activation signal (A) are supplied to the computation unit 2 which is operatively connected to the sensor system 3.

A driver or user of the feedback system may use input device 5 to enter driver inputs. For example, a user may adjust the sensitivity of feedback (S), the intensity of feedback (I), and whether the feedback system is switched on or off (E). Driver adjustments to the inputs may be carried out in predefined stages or in an infinitely variable manner. The inputs made by the user are output both to the computation unit 2 and to the sensor system 3 or a corresponding control unit of the vehicle.

In accordance with the present teachings, an exemplary embodiment of the system includes main inputs of the feedback system that comprise two categories of data, namely vehicle data 4 and driver inputs 5. With the driver inputs 5, a user is able to switch the alarm notification feature on and off, to adjust the intensity of the warning, for example low, medium and high, and/or to configure how early or quickly a warning is generated before the expected lane change (e.g., sensitivity). The vehicle data 4 may comprise signals from the vehicle or the sensors that are used by the method. An activation signal (A) which is responsible for triggering or activating the warning is also included. The signal (A) may be output by the sensor system 3. For example, a camera module on the front of the vehicle, and may be dependent on the driver inputs 5. The activation signal (A) which is typically a signal derived from sensor data or signals may also be generated in the computation unit 2.

In accordance with the present teachings, an exemplary embodiment of the system provides the option to adjust the intensity of the feedback based on the speed v of the vehicle. Thus, a method of providing feedback in accordance with an exemplary embodiment of the present disclosure includes adjusting the intensity of the feedback. This means that the method may be speed-dependent and it is possible to increase or reduce the intensity of the warning based on the speed of the vehicle (v). In an example, the feedback system may be automatically switched off when the speed of the vehicle falls below a threshold low speed (e.g., 20 kph) or rises above a threshold high speed (e.g., 200 kph).

In addition to the speed (v), further data (x) relating to the vehicle and/or the environment may be used to adapt the intensity, form and/or length of the feedback. For example, the condition of the road or data relating to road unevenness may be a further input for stipulating the intensity of the feedback. Accordingly, the intensity of the feedback may be increased in the case of poor or uneven road conditions in order to always keep the feedback distinguishable from road influences. Further signals such as the steering angle, steering rate, yaw rate or acceleration etc. may be used to adapt the method or the feedback.

Based on the signals or groups of signals 4 and 5, described herein, the feedback algorithm 6 generates a feedback (F). According to the algorithm 6, three states are possible: in a first state 7, the feedback feature (FB) is inactive. For example, the algorithm can be switched on by the driver, or automatically switched on by virtue of the vehicle being started or by virtue of a particular speed (e.g., lower threshold speed) being reached or exceeded. Once the (FB) algorithm is initiated, the algorithm then reaches a second state 8 in which the feedback feature (FB) is active, that is to say the vehicle is being monitored for lane deviations. In response to receipt of an activation signal (A), the system reaches a third state 9 in which the Feedback (F) is generated. After the feedback has been concluded or possibly terminated, the system returns to the second state 8 and from there returns to the first state 7 as a result of being switched off (by the driver), or due to the speed dropping below the lower threshold. The system may also return from the second state 8 to the third state 9 again as a result of receipt of a new activation signal (A).

In accordance with the present teachings, the feedback (F) may comprise an angle requirement in the form of a haptic warning sequence consisting of a plurality of pulses, the number, length, frequency and/or form of which can be adapted. For example, a user of the feedback system may adjust these characteristics of the haptic warning.

In accordance with the present teachings, an exemplary embodiment of the system includes a safety device or an arbiter device 10 that receives the feedback (F) and an angle requirement (PS) originating from the power steering system (e.g., AFS). The arbiter device 10 processes both signals and monitors plausibility, reliability, and safety of the angle requirements to ensure the vehicle may be safely controlled.

The arbiter device 10 outputs the superimposed signal, that is to say the angle requirements from the feedback system and power steering system, to an actuator 12 or to a control unit of the steering system.

A power steering system 11 comprises an actuator 12 in the steering wheel or on the steering column. The actuator 12 provides a superimposed angle, with the result that the steering effort (steering angle) of the driver is reduced. The actuator 12 may also be used to generate feedback such as haptic feedback (e.g., high-frequency vibrations) for the feedback system. In order to provide the feedback functionality in addition to the power steering technology, the feedback algorithm algorithm 6 may superimpose an additional steering angle requirement or request on the power steering (e.g., AFS) angle requirement if the driver leaves or wishes to leave the lane in an undesirable manner. Since both the power steering functionality and the Feedback (F) functionality are angle-based, these signals may be combined or superimposed. For example, an angle request for the feedback system may be added to the overall angle request (e.g., from the power steering system). Here, a change in steering angle of the steering wheel may then trigger the actuator 12 to generate haptic feedback, for instance, based on the angle request for the feedback system.

In accordance with the present teachings, an exemplary embodiment of the system includes an optional display device 13 for outputting feedback (F). For example, the feedback (F) may comprise an audible warning and the display device may comprise a speaker or the feedback (F) may comprise a visual warning and the display device may comprise a visual display (e.g., a display screen, an indicator light on a vehicle instrument panel, and the like).

Figure 2:
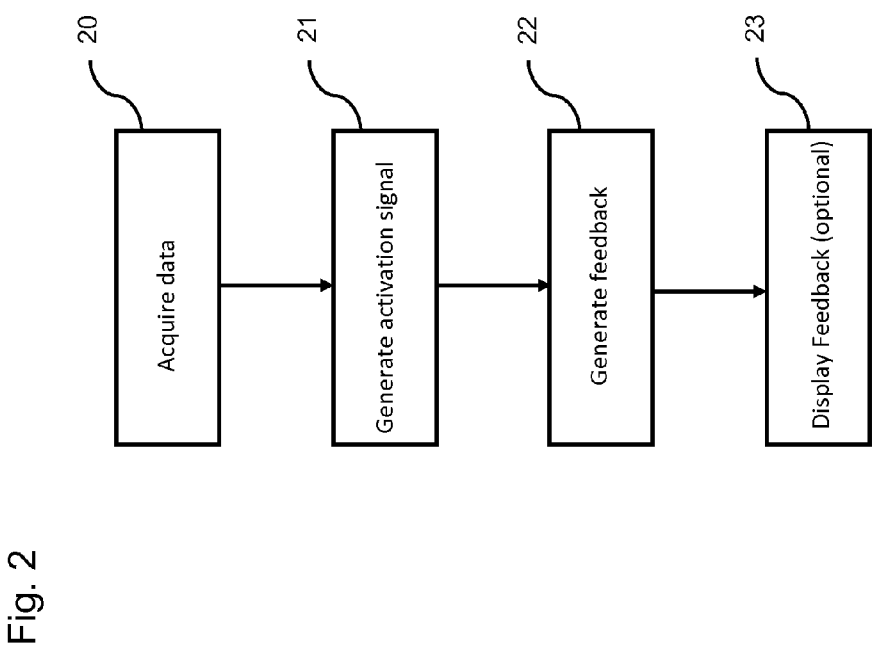
FIG. 2 shows an exemplary method for responding to a lane deviation event of a vehicle in accordance with the present teachings.

FIG. 2 illustrates a method for providing feedback in the event of a lane deviation of a vehicle according to an exemplary embodiment of the present disclosure. It should be noted that the method or the algorithm for providing feedback in the event of a lane deviation can run independently of the states described with reference to FIG. 1 (e.g., states 7 to 9). However, in various exemplary embodiments, the states may also be used to perform the method and based on the additional data required increase the reliability of the method.

In accordance with the present teachings, an exemplary embodiment of the method begins with data being acquired at step 20. The data may comprise vehicle data 4 and a driver data or inputs 5.

The activation signal (A) may be generated at a second step 21 based on the acquired data. In an embodiment, this may take place either directly in the sensor system (in which case the activation signal (A) logically belongs to the vehicle data 4) or in the computation unit 2 (in which case the activation signal (A) may be internally assigned to the computation unit 2).

In an example, the sensor system may comprise one or more cameras that are used to determine lane boundaries.

Based on the acquired data for the vehicle (e.g., vehicle speed, steering angle, and the like) and the determined lane boundaries, a lane departure, or an anticipated lane departure, may be detected. In response to the lane departure or anticipated lane departure, the activation signal (A) may be generated It should be noted that the two steps 20 and 21 may be carried out during or in all states 7, 8 and 9 as described with reference to FIG. 1. In an example, the data may be acquired in state 8 (step 21) since the data may be used for the active algorithm. The activation signal (A) may also be generated in the state 8 and finally causes the state change to state 9.

In a third step 22, feedback (F) (e.g., a haptic warning) may be generated on the basis of the activation signal (A). In an embodiment, the generation may comprise signal generation or may additionally comprise an output or physical generation using the power steering system (e.g., AFS) or the actuator 12 of the power steering system 11 here. The third step 22 may take place in the third state 9 of the feedback algorithm 6, in which case the arbiter 10 and the actuator 12 maybe be used in the implementation of this example.

In an optional fourth step 23, feedback (F) (e.g., a visual and/or audible warning) may be generated on the basis of the activation signal (A). In an embodiment, the generation may comprise signal generation or may additionally comprise an output or physical generation using the display device 13. The fourth step 23 may take place in the third state 9 of the feedback algorithm 6, in which case the arbiter 10 and the display device 13 maybe be used in the implementation of this example.

The details and dependencies of input variables when generating the activation signal (A) and the feedback (F) are described herein and likewise apply here in connection with FIG. 2; they are therefore not repeated.

The method illustrated in FIG. 2 can be performed in one or more devices of the steering system 1. For example, the method can be performed by control device of the steering system 1 such as a central control unit. The control device can be implemented within any element of the steering system 1 such as control unit 2. Alternatively, the control device can be a separate device from any of the above-described steering system 1 elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for providing feedback in the event of a lane deviation of a vehicle having a power steering system, the method comprising:
    acquiring vehicle data;
    generating an activation signal based on the acquired vehicle data; and
    generating a haptic warning based on the activation signal using an actuator of the power steering system, wherein the actuator provides auxiliary torque, different from the haptic warning, for steering assistance.

2. The method of claim 1, wherein the haptic warning comprises a sequence of a plurality of pulses.

3. The method of claim 1, wherein the haptic warning is generated based on a change in steering angle.

4. The method of claim 1, further comprising:
    receiving input from a user of the vehicle such that the generation of the activation signal is further based on the received input.

5. The method of claim 1, wherein the generation of the activation signal is based at least in part on the speed of the vehicle.

6. The method of claim 1, wherein the generation of the haptic warning is based at least in part on a steering angle speed.

7. The method of claim 1, further comprising:
receiving input indicative of road conditions, wherein generation of the haptic warning is based at least in part on the received input.

8. The method of claim 1, further comprising:
monitoring the power steering system and the feedback in the event of a lane deviation using an arbiter.

9. A method for providing feedback in the event of a lane deviation of a vehicle with power steering system, the method comprising:
receiving vehicle data comprising at least a steering angle;
generating an activation signal based on at least the steering angle;
instructing a component of the power steering system to generate a warning based on the generated activation signal, wherein the component provides auxiliary torque, different from the haptic warning, for steering assistance.

10. The method of claim 9, wherein the warning is generated based on a change in steering angle.

11. The method of claim 9, wherein the generation of the activation signal is based on a vehicle speed.

12. The method of claim 9, wherein the generation of the warning is based on a change in the steering angle.

13. The method of claim 9, further comprising:
receiving input indicative of road conditions, wherein the generation of the warning is based at least in part on the determined road conditions.

14. The method of claim 9, further comprising:
receiving, at an arbiter, a first signal comprising an angle requirement from the power steering system and a second signal comprising the instruction to generate the warning;
processing, at the arbiter, the first signal and second signal; and
instructing the component of the power steering system based on the processed first signal and second signal.

15. The method of claim 14, wherein the component of the power steering system is an actuator.

16. A system for providing feedback in the event of a lane deviation of a vehicle with a power steering system, the system comprising:
a control unit configured to:
receive vehicle data comprising at least a steering angle;
generate an activation signal based on at least the steering angle;
instruct a component of the power steering system to generate a warning based on the generated activation signal, wherein the component provides auxiliary torque, different from the haptic warning, for steering assistance.

17. The system of claim 16, wherein the warning comprises haptic feedback generated based on a change in steering angle.

18. The system of claim 16, wherein the generation of the activation signal is based on a vehicle speed.

19. The system of claim 16, further comprising an arbiter configured to:
receive a first signal comprising an angle requirement from the power steering system and a second signal comprising the instruction to generate the warning;
process the first signal and second signal; and
instruct the component of the power steering system based on the processed first signal and second signal.

20. The system of claim 19, wherein the component of the power steering system is an actuator.

21. The system of claim 16, wherein the warning comprises at least one of an optical warning, an audible warning, and a haptic feedback in the steering wheel.

* * * * *